United States Patent [19]

Jurras, III et al.

[11] Patent Number: 5,564,840
[45] Date of Patent: Oct. 15, 1996

[54] PRELOAD ADJUSTMENT APPARATUS AND METHOD

[75] Inventors: Mark I. Jurras, III, Canton Center; Richard L. Lemoine, Harwinton; Brian McMorrow, Waterbury, all of Conn.

[73] Assignee: The Torrington Company, Torrington, Conn.

[21] Appl. No.: 581,816

[22] Filed: Jan. 2, 1996

[51] Int. Cl.$^6$ .................................................. F16C 33/58
[52] U.S. Cl. .................... 384/517; 384/1; 29/898.09
[58] Field of Search ........................ 384/1, 500, 517, 384/519, 563; 29/898.09

[56] References Cited

U.S. PATENT DOCUMENTS

| Re. 34,310 | 7/1993 | Duncan | 384/517 |
|---|---|---|---|
| 3,313,581 | 4/1967 | Kusakabe | 384/517 |
| 3,902,084 | 8/1975 | May, Jr. | 310/8.1 |
| 3,902,085 | 8/1975 | Bizzigotti | 310/8.3 |
| 4,551,032 | 11/1985 | Mottershead | 384/517 |
| 4,570,096 | 2/1986 | Hara et al. | 310/328 |
| 4,655,616 | 4/1987 | Ducan | 384/446 |
| 4,657,412 | 4/1987 | McLarty et al. | 384/447 |
| 4,808,013 | 2/1989 | Waddington | 384/563 X |
| 4,850,719 | 7/1989 | Moseley et al. | 384/1 |
| 5,030,016 | 7/1991 | Schoeffter | 384/517 X |
| 5,067,827 | 11/1991 | Bokel | 384/517 X |
| 5,094,551 | 3/1992 | Kitamura et al. | 384/563 X |

OTHER PUBLICATIONS

Japanese Society of Mechanical Engineering International Journal, Series III, vol. 31, No. 3, May 1988, pp. 593–597.

*Primary Examiner*—Thomas R. Hannon
*Attorney, Agent, or Firm*—John C. Bigler

[57] ABSTRACT

First and second radial actuating clamps provide selective radial engagement with a housing for preloaded bearings. An axial actuator, retained between the first and second radial actuating clamps, provides selective expansion and contraction of the axial distance between the first and second radial actuator clamps. A method for adjusting the preload of preloaded bearings mounted within a housing is also disclosed. The method includes alternate clamping and unclamping of two radial actuating clamps against the housing while an axial actuator expands and contracts the axial distance between the radial actuating clamps.

21 Claims, 3 Drawing Sheets

5,564,840

PRELOAD ADJUSTMENT APPARATUS AND METHOD

BACKGROUND OF THE INVENTION

This invention relates generally to preloaded bearings as used in spindles, axles or shafts and, more particularly, to a preload adjustment apparatus for use with preloaded bearings.

In order for a machine tool spindle to maintain high accuracy under varying load conditions, the spindle must have a high degree of stiffness. Stiffness is generally obtained by using angular contact ball bearings mounted in pairs such that the bearings are preloaded against each other. That is, a thrust load is applied such that the bearing balls are forced tightly against the raceways.

Preloading the bearings, to obtain the required stiffness, increases the stresses in the bearings, causing heat generation. This reduces bearing life and limits operating speed. By varying the bearing preload according to need, bearing life and operating speed can be improved. A mechanical apparatus for varying the preload is described in U.S. Pat. No. 4,657,412.

Preload can also be varied using a piezoceramic actuator as described in U.S. Pat. No. 4,850,719. As disclosed therein, a D.C. potential is applied to interfaces of multiple piezoelectric wafers in response to varying load conditions to control bearing stiffness. However, because current piezoelectric actuator technology produces only small displacements, the ability to compensate for thermal expansion and control stiffness is severely limited.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a preload adjustment apparatus for use with preloaded bearings mounted within a housing including first and second radial actuating means for selective radial engagement with the housing such that axial movement relative to the housing is prevented. Axial actuating means between the first and second radial actuating means provides selective expansion and contraction of the axial distance between the first and second radial actuating means. Retention means maintains contact between the axial actuating means and the first and second radial actuating means.

In another aspect of the invention, this is accomplished by providing a method for adjusting the preload of preloaded bearings mounted within a housing. The method includes alternate engagement of two radial actuating means with the housing and alternate expanding and contracting of an axial actuator means between the two radial actuating means.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
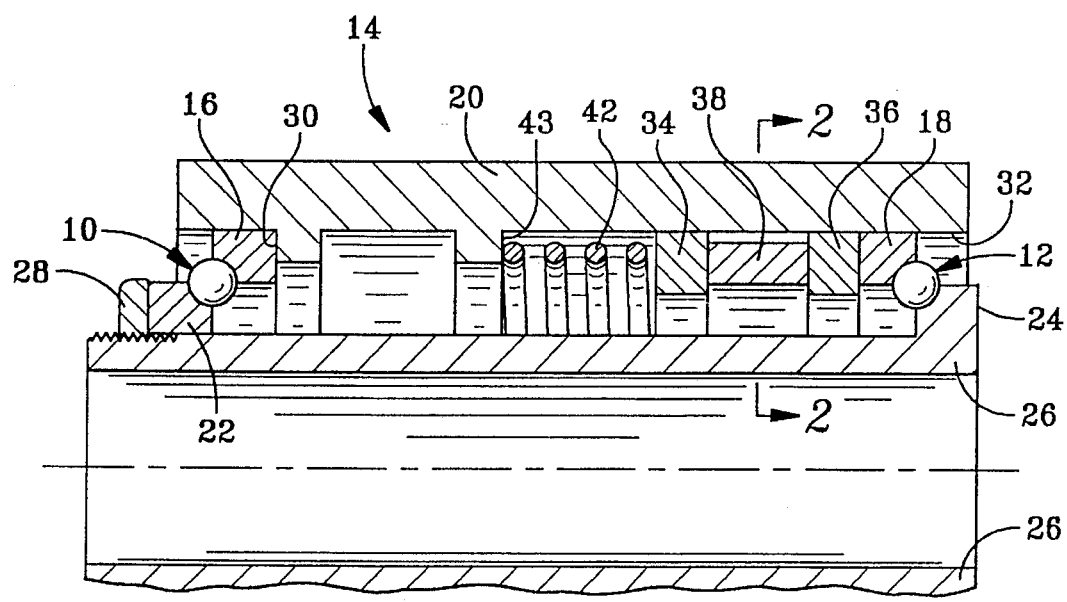
FIG. 1 is a longitudinal cross-section of portions of a machine tool spindle illustrating a first embodiment of the apparatus of the present invention for adjusting the preload of preloaded bearings.

Referring now to the drawings, FIG. 1 illustrates an apparatus according to the present invention for adjusting the preload of first and second preloaded bearings 10 and 12 mounted within housing 14 of a machine tool spindle or similar device.

Outer rings 16 and 18 of preloaded bearings 10 and 12 are mounted on outer housing member 20 and inner rings 22 and 24 of preloaded bearings 10 and 12 are mounted on inner housing member 26. Although other arrangements may be used, inner ring 24 may be integral with inner housing member 26 and inner ring 22 may be retained axially by threaded collar 28, as shown. In this embodiment, outer ring 16 is axially restrained by shoulder 30 and outer ring 18 is slidably movable with respect to cylindrical inner surface 32 of outer housing member 20.

First radial actuating means 34 is selectively movable radially to engage housing 14 such that axial movement of first radial actuating means 34 relative to housing 14 is prevented. Second radial actuating means 36 is selectively movable radially to engage housing 14 such that axial movement of second radial actuating means 36 relative to housing 14 is prevented. In the embodiment shown, radial actuating means 34 and 36 engage outer housing member 20; however, a reversed configuration with engagement of inner housing member 26 may also be used.

Figure 2:
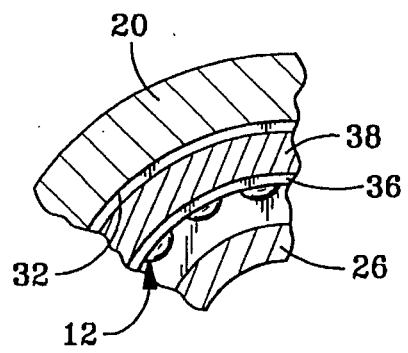
FIG. 2 is a transverse cross-section of portions of the machine tool spindle of FIG. 1, as indicated in FIG. 1.
Figure 3:
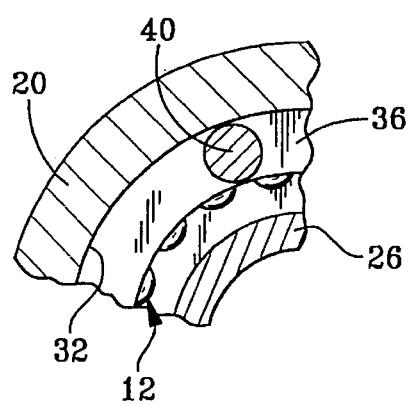
FIG. 3 is a transverse cross-section similar to FIG. 2 but illustrating a second embodiment of the apparatus of the present invention for adjusting the preload of preloaded bearings.

Axial actuating means 38 between first and second radial actuating means 34 and 36 is selectively movable to expand and contract the axial distance between first and second radial actuating means 34 and 36. Axial actuating means 38 may be made of a piezoceramic material and may have a hollow cylindrical configuration, as illustrated in FIG. 2. Alternatively, axial actuating means 38 may be a plurality of axial elements 40. For example, axial elements 40 may be three rods distributed circumferentially within housing 14, as illustrated in FIG. 3, and may be actuated independently. Housing 14 may include additional structure, not shown, to maintain the spacing and alignment of axial elements 40.

Biasing means 42, such as a compression spring between shoulder 43 and first radial actuator means 34, for example, may be used to maintain contact between axial actuating means 38 and radial actuating means 34 and 36. In addition, biasing means 42 may be designed to exert a predetermined force when radial actuating means 34 and 36 are not clamped against housing 14 and when axial actuating means 38 is contracted to its minimum axial length. Alternatively, biasing means 42 may be omitted and axial actuating means 38 may be bonded or otherwise fixed to radial actuating means 34 and 36 to maintain the desired contact.

To increase the preload force on preloaded bearings 10 and 12, first radial actuating means 34 is moved radially into engagement with housing 14 such that axial movement of first radial actuating means relative to housing 14 is prevented, and second radial actuating means 36 is moved out of engagement with housing 14 such that axial movement of second radial actuating means 36 relative to housing 14 is not prevented. Subsequently, axial actuating means 38 is expanded such that the axial distance between first and second radial actuating means 34 and 36 is increased. Next, second radial actuating means 36 is moved radially into engagement with housing 14 such that axial movement of second radial actuating means 36 relative to housing 14 is prevented. Then, first radial actuating means 34 is moved radially out of engagement with housing 14 such that axial movement of first radial actuating means 34 relative to the housing is not prevented. Next, axial actuating means 38 is contracted such that the axial distance between first and second radial actuating means is decreased. By repeating this sequence though multiple iterations, the preload can be increased as much as desired, even though each individual stroke of axial actuating means 38 may be small.

To decrease the preload force on preloaded bearings 10 and 12, the process is reversed. That is, when first radial actuating means 34 is clamped against housing 14 and second radial actuating means 36 is free to move relative to housing 14, axial actuating means 38 is contracted such that the axial distance between first and second radial actuating means 36 is decreased. Next, second radial actuating means 36 is clamped against housing 14 and first radial actuating means 34 is unclamped while axial actuating means 38 is expanded such that the distance between first and second radial actuating means is increased. Again, the sequence is repeated through multiple iterations, each decreasing the preload a small amount, until the desired preload is reached.

The process of increasing or decreasing the preload can be considered to be a form of walking along the housing in a series of one-legged steps, or a movement similar to that of an inchworm. Controlling the preload can be done by counting the steps taken by the axial actuator or by adding a load monitor for direct reading of the preload to provide feedback. If multiple axial actuators are used as illustrated in FIG. 3, a load monitor may be added for each axial actuator element to allow feedback control of each axial actuator separately to ensure that the preload is balanced along the circumference of the preloaded bearings.

Figure 4:
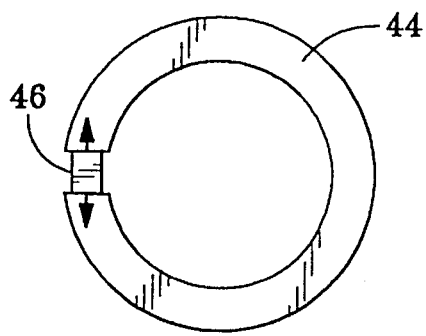
FIGS. 4, 5, 6 and 7 are end views illustrating alternative constructions of the radial actuating means of the present invention.
Figure 5:
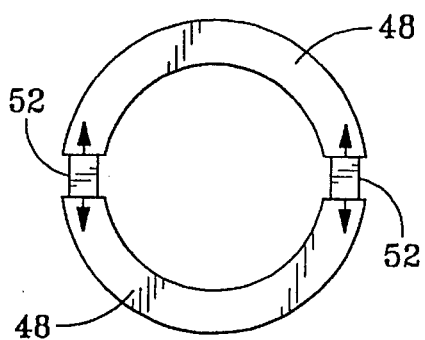
Figure 6:
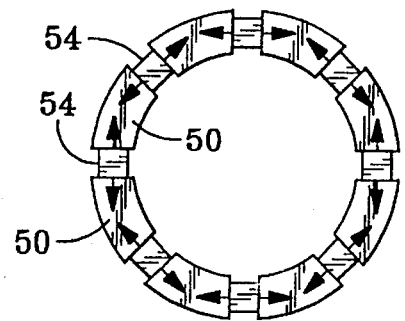

The simplest configuration for radial actuator means 34 and 36 is a uniform ring. Alternatively, many variations that expand or contract against housing 14 may be used, of which a few are illustrated in FIGS. 4 through 8. FIG. 4 illustrates split ring 44 with linear actuator 46. FIGS. 5 and 6 illustrate multiple segments 48 and 50 separated by linear actuators 52 and 54, respectively. The engaging surfaces of housing 14 and radial actuator means 34 and 36 may be grooved or otherwise configured to resist axial sliding movement.

Figure 7:
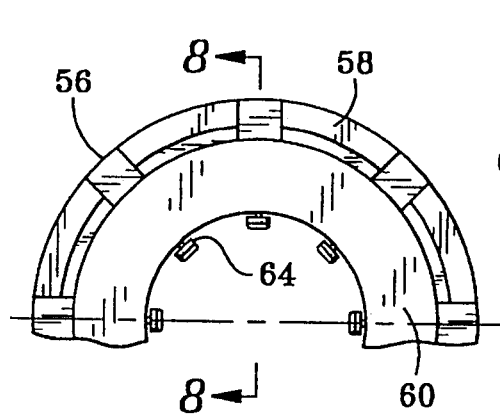
Figure 8:
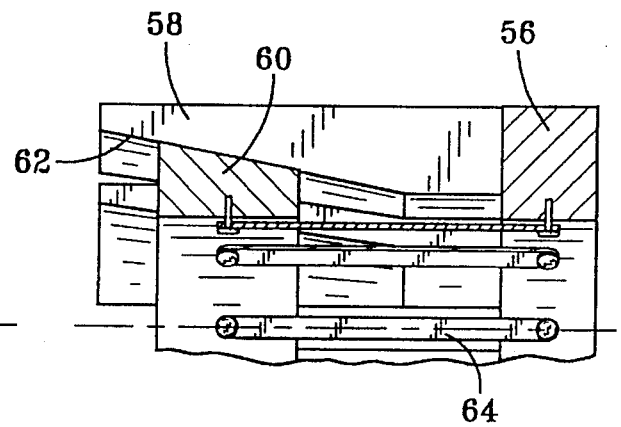
FIG. 8 is a longitudinal cross-section of a portion of the radial actuating means of FIG. 7, as indicated in FIG. 7.

FIGS. 7 and 8 illustrate another configuration for radial actuator means 34 and 36 comprising a collet-like device. Slotted ring 56 includes slots that form fingers 58. As wedge ring 60 is forced axially against conical surfaces 62 of fingers 58, by contracting links 64 or another contracting device, fingers 58 are spread radially outward against housing 14. Contracting links 64 may be made of titanium-nickel (shape memory) alloy or another contracting material.

Figure 9:
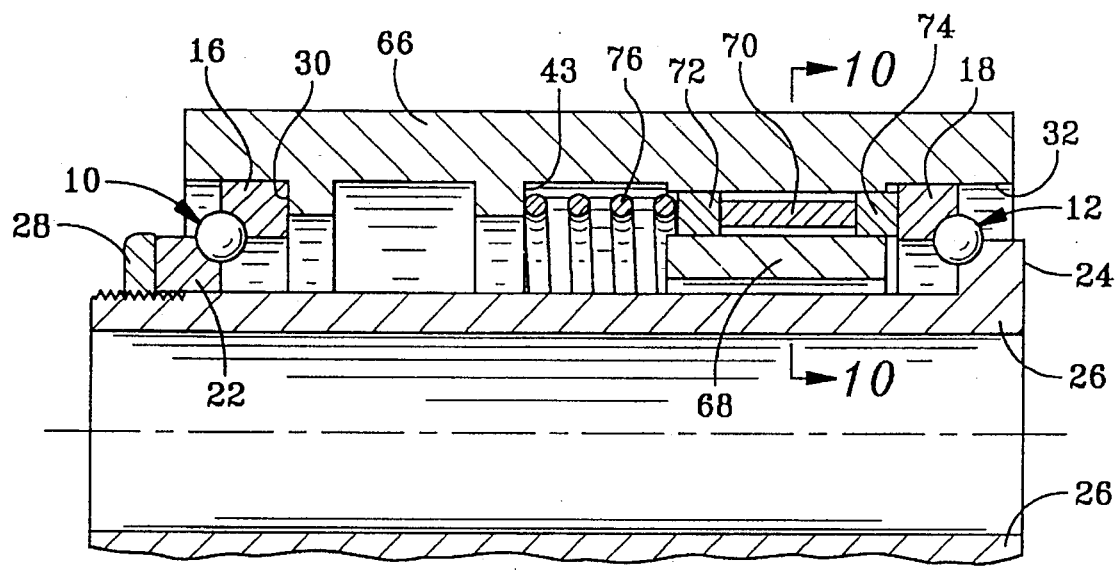
FIG. 9 is a longitudinal cross-section of portions of a machine tool spindle illustrating a third embodiment of the apparatus of the present invention for adjusting the preload of preloaded bearings.
Figure 10:
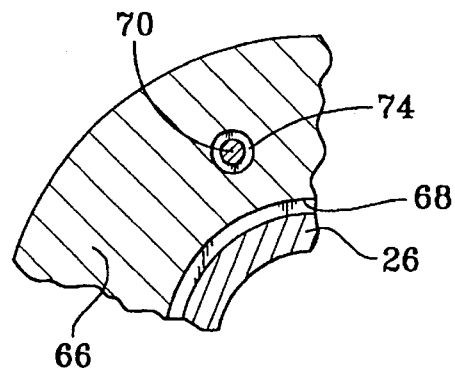
FIG. 10 is a transverse cross-section of portions of the machine tool spindle of FIG. 9, as indicated in FIG. 9.

FIGS. 9 and 10 illustrate a further embodiment of the present invention similar to that of FIGS. 1 and 3 but including additional housing structure and a different form of radial actuating means. Outer housing member 66 is similar to outer housing member 20 of FIG. 1, including shoulders 30 and 43 and cylindrical inner surface 32. In addition, outer housing member 66 includes a reduced inner diameter portion 68 having a plurality of longitudinal bores, each receiving one axial actuating element 70 and radial actuating means 72 and 74. In this embodiment, the radial actuating means may be cylindrical and may engage the respective longitudinal bore of the housing over the cylindrical surface of the radial actuating means, not merely in the radial directions. Axial actuating element 70 may be fixed to radial actuating means 72 and 74 or may be maintained in contact with those elements by optional preload spring 76.

Although the invention has particular advantages when used with piezoelectric axial actuators with short strokes, other types of axial actuators such as those using magnetostrictive, titanium-nickel (shape memory) alloys, and thermopolymer materials, for example, may also be used. Similarly, radial actuating means 34 and 36 may use magnetostrictive, titanium-nickel (shape memory) alloys, thermopolymer materials and other mechanisms in addition to piezoelectric materials to effect the desired clamping. Preferably, each of the actuating means is electrically activated.

From the above description, it should be apparent that the present invention provides an apparatus for adjusting the preload of preloaded bearings that is not limited by a short single stroke of an axial actuator. The apparatus uses iterations to overcome effects of thermal expansion and control preload for variations in rotational speed and other parameters. The apparatus may be used to continually monitor and control preload during operation of the machine spindle or other device. And, unlike many spring and hydraulic mechanisms for controlling preload, the present invention results in uniform axial stiffness in both axial directions.

Having described the invention, what is claimed is:

1. A preload adjustment apparatus for use with preloaded bearings mounted within a housing, the apparatus comprising:

first radial actuating means for selective radial engagement with the housing such that axial movement of the first radial actuating means relative to the housing is prevented;

second radial actuating means for selective radial engagement with the housing such that axial movement of the second radial actuating means relative to the housing is prevented;

axial actuating means between the first and second radial actuating means for selective expansion and contraction of the axial distance between the first and second radial actuating means; and retention means for maintaining contact between the axial actuating means and the first radial actuating means and the second radial actuating means.

2. The preload adjustment apparatus according to claim 1, wherein the first and second radial actuating means are movable radially outwardly to prevent movement of the first and second radial actuating means relative to the housing.

3. The preload adjustment apparatus according to claim 1, wherein at least one of the preloaded bearings is slidably movable in the housing.

4. The preload adjustment apparatus according to claim 1, wherein the retention means is a compression spring providing minimum preload.

5. The preload adjustment apparatus according to claim 1, wherein the preloaded bearings have an axis and the axial actuating means has a tubular configuration and is positioned about said axis.

6. The preload adjustment apparatus according to claim 1, wherein the first and second radial actuating means are annular and the axial actuating means comprises a plurality of axial elements distributed along the circumference of the first and second radial actuating means.

7. The preload adjustment apparatus according to claim 1, wherein at least a portion of the axial actuating means is made of a piezoelectric material.

8. The preload adjustment apparatus according to claim 1, wherein at least a portion of the first and second radial actuating means is made of a piezoelectric material.

9. The preload adjustment apparatus according to claim 1, wherein the axial actuating means is fixed to the first and second radial actuating means such that contact between the axial actuating means and the first and second radial actuating means is maintained.

10. A method for adjusting the preload of preloaded bearings mounted within a housing, the method comprising the steps:

radially moving a first radial actuating means into engagement with the housing such that axial movement of the first radial actuating means relative to the housing is prevented;

changing the axial length of an axial actuating means between the first and a second radial actuating means such that the axial distance between the first and second radial actuating means is changed;

radially moving the second radial actuating means into engagement with the housing such that axial movement of the second radial actuating means relative to the housing is prevented;

radially moving the first radial actuating means out of engagement with the housing such that axial movement of the first radial actuating means relative to the housing is not prevented; and changing the axial length of the axial actuating means between the first and second radial actuating means such that the axial distance between the first and second radial actuating means is changed.

11. The method according to claim 10, further comprising biasing one of the first and second radial actuating means against the axial actuating means such that a minimum preload is maintained.

12. The method according to claim 10, further comprising attaching the axial actuating means to the first and second radial actuating means such that contact is maintained between the axial actuating means and the first and second radial actuating means.

13. The method according to claim 10, wherein the steps are repeated until a predetermined preload is achieved.

14. The method according to claim 10, wherein the radial movement of the first and second radial actuating means to effect engagement with the housing is radially outward.

15. The method according to claim 10, wherein at least one of the preloaded bearings is slidably movable relative to the housing.

16. The method according to claim 10, wherein the retention means is a compression spring and provides a minimum preload on the preloaded bearings.

17. The method according to claim 10, wherein the preloaded bearings have an axis and the axial actuating means is tubular and is positioned about said axis.

18. The method according to claim 10, wherein the first and second radial actuating means are annular and the axial actuating means comprises a plurality of axial elements spaced circumferentially along the radial actuating means.

19. The method according to claim 18, wherein the axial elements are movable independently.

20. The method according to claim 10, wherein at least a portion of the axial actuating means is made of a piezoelectric material.

21. The method according to claim 10, wherein at least a portion of the radial actuating means is made of a piezoelectric material.

* * * * *